United States Patent
Courcier et al.

(10) Patent No.: US 10,184,632 B2
(45) Date of Patent: Jan. 22, 2019

(54) LIGHTING MODULE FOR A DEVICE FOR LIGHTING IN LIGHT SEGMENTS OF A MOTOR VEHICLE HEADLIGHT

(71) Applicant: VALEO VISION, Bobigny (FR)

(72) Inventors: Marine Courcier, Paris (FR); Vanesa Sanchez, Bois Colombes (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/516,299

(22) PCT Filed: Oct. 2, 2015

(86) PCT No.: PCT/EP2015/072882
§ 371 (c)(1),
(2) Date: Mar. 31, 2017

(87) PCT Pub. No.: WO2016/050983
PCT Pub. Date: Apr. 7, 2016

(65) Prior Publication Data
US 2017/0307166 A1  Oct. 26, 2017

(30) Foreign Application Priority Data
Oct. 2, 2014  (FR) ..................................... 14 59455

(51) Int. Cl.
*F21S 41/275* (2018.01)
*F21S 41/24* (2018.01)
(Continued)

(52) U.S. Cl.
CPC .............. *F21S 41/275* (2018.01); *B60Q 1/04* (2013.01); *F21S 41/141* (2018.01);
(Continued)

(58) Field of Classification Search
CPC .. F21S 48/1283; F21S 48/115; F21S 48/1317; F21S 8/10
See application file for complete search history.

(56) References Cited

U.S. PATENT DOCUMENTS

2007/0058386 A1  3/2007  Albou
2011/0038168 A1  2/2011  Schug
(Continued)

FOREIGN PATENT DOCUMENTS

EP  1 762 776 A1  3/2007
EP  2 587 125 A2  5/2013
(Continued)

OTHER PUBLICATIONS

International Search Report dated Dec. 7, 2015 in PCT/EP2015/072882 filed Oct. 2, 2015.
(Continued)

*Primary Examiner* — Anne M Hines
(74) *Attorney, Agent, or Firm* — Oblon, McClelland, Maier & Neustadt, L.L.P.

(57) ABSTRACT

The invention relates to a lighting module for a headlight for lighting in light segments of a motor vehicle, as well as to a headlight comprising modules in accordance with the invention. The modules according to the invention are characterized in that they allow the creation of headlights that have a continuous external projection surface and implement a lighting function in segments, such as in strips, through the juxtaposition of identical modules.

18 Claims, 3 Drawing Sheets

(51) Int. Cl.
  *F21S 41/255*   (2018.01)
  *F21S 41/26*    (2018.01)
  *F21S 41/143*   (2018.01)
  *F21S 41/663*   (2018.01)
  *F21S 43/00*    (2018.01)
  *F21S 41/141*   (2018.01)
  *F21S 41/32*    (2018.01)
  *B60Q 1/04*     (2006.01)
  *F21S 41/16*    (2018.01)

(52) U.S. Cl.
  CPC ............ *F21S 41/143* (2018.01); *F21S 41/16* (2018.01); *F21S 41/24* (2018.01); *F21S 41/255* (2018.01); *F21S 41/26* (2018.01); *F21S 41/32* (2018.01); *F21S 41/663* (2018.01); *F21S 43/00* (2018.01)

(56) References Cited

U.S. PATENT DOCUMENTS

2014/0078768 A1    3/2014  De Lamberterie et al.
2016/0084462 A1*   3/2016  Suwa ............... F21S 41/143
                                                    362/511
2016/0290583 A1*  10/2016  Suwa ............... F21S 41/143

FOREIGN PATENT DOCUMENTS

EP     2 587 125 A3      5/2013
EP     2 708 798 A1      3/2014
EP     2 743 567 A1      6/2014
EP     2 767 752 A1      8/2014
WO   WO 2009/130655 A2  10/2009
WO   WO 2009/130655 A3  10/2009

OTHER PUBLICATIONS

French Preliminary Search Report dated May 28, 2015 in Patent Application No. 1459455 filed Oct. 2, 2014.

* cited by examiner

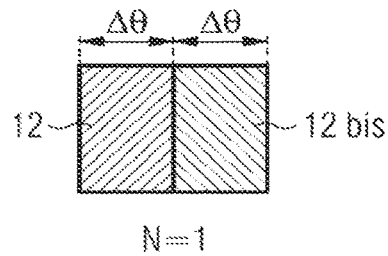
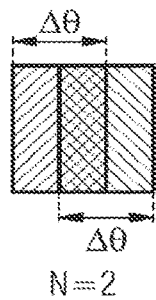
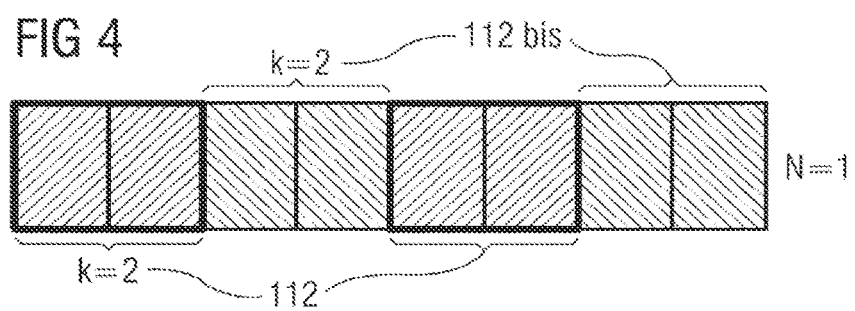
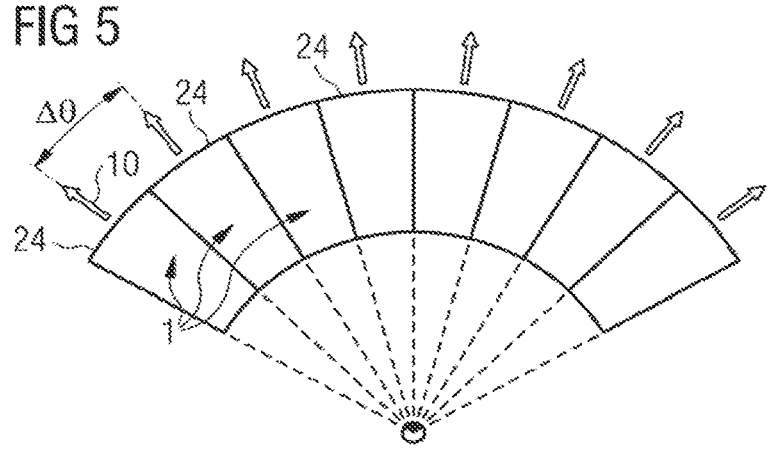
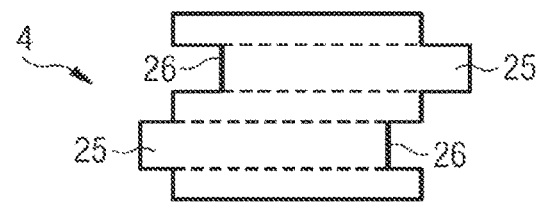

LIGHTING MODULE FOR A DEVICE FOR LIGHTING IN LIGHT SEGMENTS OF A MOTOR VEHICLE HEADLIGHT

The invention concerns the field of headlights, notably headlights for motor vehicles. The invention relates to a headlight for lighting in light segments, such as strips, including a lighting module according to the invention.

A motor vehicle is equipped with headlights, or headlamps, intended to illuminate the road in front of the vehicle, at night or under low lighting conditions. The headlights can generally be used in two lighting modes: a first mode termed the "high beam" mode and a second mode termed the "low beam" mode. The "high beam" mode makes it possible to illuminate the road brightly to a great distance in front of the vehicle. The "low beam" mode produces more limited illumination of the road, although nevertheless offering a good view, without dazzling other users of the road. These two lighting modes are complementary to each other. The driver of the vehicle must change mode manually as a function of the prevailing circumstances, with the risk of inadvertently dazzling another user of the road. In practice, changing the lighting mode manually can prove unreliable and sometimes dangerous. Moreover, the low beam mode sometimes gives the driver of the vehicle an unsatisfactory view.

To improve on this situation, headlights have been proposed provided with an Adaptive Driving Beam (ADB) function. An ADB function of this kind is intended to detect automatically a user of the road liable to be dazzled by a lighting beam emitted by a headlight in high beam mode and to modify the contour of that lighting beam to create a shadow zone at the location where the detected user is located. The ADB function has many advantages: ease of use, better view compared to lighting in low beam mode, more reliable change of mode, greatly reduced risk of dazzle, safer driving.

The document EP2743567A1 describes a motor vehicle headlight including modules generating lighting in light segments in the form of strips via a projection lens. Each module includes a series of light guides for shaping radiation from light-emitting diodes. Using a headlight of this kind, it is possible to illuminate an environment using light segments that take the form of strips of light oriented vertically at controlled positions. However, the integration of a headlight into a given vehicle and the styling imposed by the manufacturer of the vehicle impose a specific shape on the projection lens.

Known headlights producing light segments use complex optical systems having projection and correction lenses of precise curvature. The geometry of a projection lens is generally optimized across all its width in order to optimize the geometry and the location of the light segments projected by a plurality of light sources that use the lens in parallel. In order to minimize optical aberrations and thereby to optimize the sharpness and the shape of the light segments, it is usual to provide a projection lens (when it is a convergent lens) having a more curved convexity on the exit face than on the entry face (vertically and horizontally). A bespoke optical system must be designed and manufactured each different disposition of the light sources and for each styling imposed by the manufacturer of the vehicle equipped with the headlight in question, leading to long development times and high development costs. Those costs are the norm, however, because motor manufacturers increasingly wish to stand out by way of an optical signature. In principle the optical signature changes for each vehicle model and requires a particular disposition of the light sources and therefore a dedicated and complex optical system to be able to implement an ADB type functionality.

An objective of the invention is to alleviate at least one of the problems arising in the prior art. To be more precise, one objective of the invention is to propose a lighting module one or more of which can be used to assemble a panoply of headlights for motor vehicles having different optical signatures and are adapted to implement an ADB type function.

The invention consists in a lighting module for a lighting device of a motor vehicle headlight producing light segments. The module includes:
  at least one primary optical element having a light pixel forming structure intended to cooperate with at least one light source and a corrector exit diopter, each primary optical element defining an optical axis;
  a projection lens.

The module is configured to project light entering the primary optical element or elements and leaving via the projection lens in the form of a light segment, such as a light polygon or strip, formed of at least one light pixel. The module is characterized in that in the normal mounting direction the exit diopter of the projection lens has a toroidal shape.

In the context of the present invention, the light segment is a polygonal pattern the width of which in a horizontal direction is constant, and said pattern can be duplicated and juxtaposed to form a continuous illuminated field. The pattern is formed of at least one light pixel and may be composed of a plurality of juxtaposed light pixels. These pixels are also polygonal and can notably be squares, rectangles, triangles, lozenges.

For example, in its simplest form, the light segment takes the form of a square or of a rectangular vertical strip formed of a single pixel. In a variant, the strip is divided vertically into rectangular or square pixels. Another segment shape variant is a vertical segment with two end portions that are rectangular strips offset horizontally and connected to each other by a lozenge-shaped portion.

The exit diopter of the projection lens preferably has in the normal mounting direction in a horizontal plane a convex curvature with a radius of curvature R given by the formula:

$$R = \frac{L}{2}\left(\sin\left(\frac{\alpha}{2}\right)^{-1}\right)$$

in which
  L is the width of the projection lens seen from in front;
  $\alpha = k(\Delta\theta)/N$, where $\Delta\theta$ is the angular width in degrees of a light segment projected by the module and k and N are positive integers.

The exit diopter of the projection lens may preferably have in the normal mounting direction in a horizontal plane a convex curvature with a radius of curvature R greater than 200 mm and preferably between 400 and 1200 mm inclusive.

The projection lens preferably includes in the normal mounting direction in a horizontal plane an entry diopter with at least one part having a convex profile, the convexity or convexities being generally aligned to the positions of the optical axes of the primary optical elements of the module.

The pixel forming structures may preferably include at least one light guide and/or cushions or microlenses.

The light source or sources may preferably include at least one light-emitting diode (LED) and/or one laser diode.

The module may preferably include lateral positioning means intended to juxtapose two identical modules horizontally in the normal mounting direction so that the exit diopters of the modules form a continuous surface.

The lateral positioning means preferably include at least one notch in a first lateral face of the projection lens and at least one protrusion in the second lateral face so that the at least one protrusion of a first module can be engaged in the corresponding at least one notch of an identical module juxtaposed horizontally in the normal mounting direction.

Alternatively, the module may include support means on which the light source or sources and the projection lens are disposed, the support means including the lateral positioning means. The support means, such as a generally plane plate, then include lateral positioning means that serve to dispose a first module laterally in the normal mounting direction beside an identical second module so that the projection lenses of the two modules form a continuous face.

The module may advantageously include a heatsink on which the light source or sources and the projection lens are disposed, the heatsink including the lateral positioning and alignment means.

The width of the module in the normal mounting direction preferably increases in the direction of the light emitted by the module.

Alternatively, the width of the module in the normal mounting direction may decrease in the direction of the light emitted by the module.

The smallest width of the module in the normal mounting direction is preferably 5 to 50% narrower than the greatest width of the module in the normal mounting direction.

The invention also consists in an assembly including a plurality of identical lighting modules according to the invention. The assembly is characterized in that the lighting modules are assembled in horizontal juxtaposition in the normal mounting direction so that the respective projection lenses form a continuous surface of the assembly.

The invention also consists in a lighting device for a motor vehicle headlight producing light segments including at least two lighting modules according to the invention or at least one assembly according to the invention or at least one lighting module according to the invention and at least one assembly according to the invention.

The invention proposes a lighting module for projecting at least one light segment, such as a light strip. A plurality of identical modules can be disposed side by side in the normal mounting direction in a headlight for motor vehicles in order to produce a lighting device producing light segments. Thanks to the specific curvature of the surface of the projection lens of each of the identical modules, this results in a continuous surface of constant curvature at the level of the projection lenses aligned in this way. Although each module can be supplied with power and controlled individually and independently of each of the other modules of an assembly of this kind, the assembly itself gives the impression of a single system for projecting light segments. Seen from in front, a single projection surface is created. The dimensions of an assembly of this kind are defined by the number of juxtaposed modules. Specific headlights and optical signatures can therefore be produced by choosing the number and location of identical modules according to the invention and the number and location of the assemblies, with a variable or identical number of modules per assembly, without this necessitating a specific development and production phase. The kit solution for designing headlights for motor vehicles proposed by the invention therefore makes it possible to reduce the time required for and the cost of producing a panoply of headlights of this kind. The relative disposition in space of different modules that are all identical to one another makes it possible to address a great diversity of styling requirements.

Other features and advantages of the present invention will be understood better with the aid of the description of examples and from the drawings, in which:

FIG. 2a is a diagrammatic top view of a module according to one preferred embodiment of the invention;

FIG. 2b shows diagrammatically light strips projected by the module from FIG. 2a;

FIGS. 3a and 3b show light strips projected by modules according to two embodiments of the invention;

FIG. 4 shows light strips projected by modules according to one embodiment of the invention;

FIG. 5 is a diagrammatic top view of an assembly of modules according to one embodiment of the invention;

FIG. 6 shows a section transverse to the optical axis through a projection lens of a module according to one embodiment of the invention;

In the following description, similar reference numbers are used to describe similar concepts through different embodiments of the invention.

Unless specifically indicated otherwise, technical features described in detail for a given embodiment may be combined with the technical features described in the context of other embodiments described by way of nonlimiting example.

Figure 1:
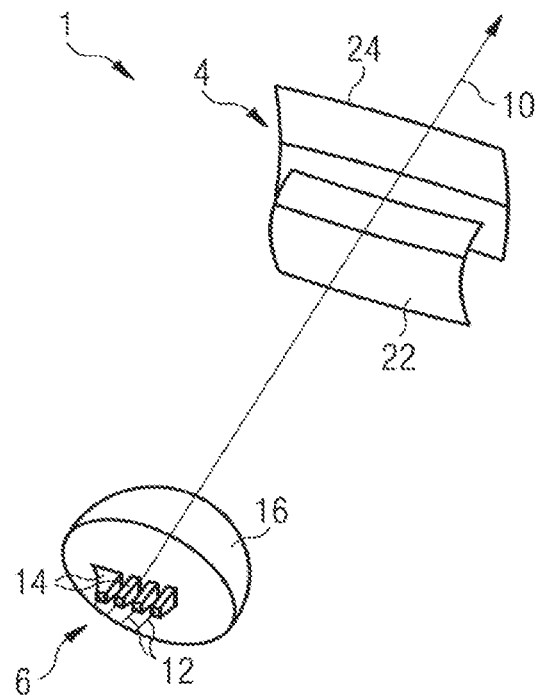
FIG. 1 is an isometric view from behind of a lighting module according to the invention.

FIG. 1 shows in simplified form a lighting module 1 according to the invention. The headlight is generally represented in the lighting direction. The headlight is partly represented by its diopters.

The lighting module 1 includes, in the lighting direction, a primary optical element 6 and a projection lens 4. The primary optical element has an optical axis 10 along which it illuminates and along which it concentrates and generally bends its rays.

The lighting module includes at least one light source 12, such as a light-emitting diode (LED) or a laser diode, which produces light rays entering the optical system via the primary optical element 6. The module 1 may further include a casing which is not shown for clarity. The light sources of the module are supplied with power in a known manner by a device for controlling the supply of power to the light sources that will not be described in detail in the context of the present invention. Such devices are known to the person skilled in the art and generally include a converter for converting a voltage supplied by a current source of a motor vehicle, such as a car battery, into a charging voltage suitable for supplying power to the light source or sources. The device controlling the supply of power makes it possible, in a manner known for ADB systems, to supply selectively and independently with power each group of light sources participating in the creation of a projected pixel.

In the FIG. 1 example the primary optical element 6 includes at least one light guide 14, four of them here, and a body with a curved exit diopter 16. The body of the primary optical element forms a correction portion with a domed, for example, hemispherical, surface 16. Each light guide 14, also referred to as a waveguide or optical guide, is associated with a primary light source 12; it conducts light through the material of the element. It has a lengthwise extent, possibly its main lengthwise extent, along the optical axis 10. The material constituting the light guides 14 and the body is transparent. Here it is an optical lens material, such as an organic material or possibly glass and is in one piece. An optical element of this kind is well known to the person skilled in the art and can be produced as described in the document EP2743567A1. Alternatively, the primary optical element may include microlenses or cushions for guiding the light emitted by the light sources.

The projection lens 4 has an entry diopter 22 facing the exit diopter 16 of the primary optical element and an exit diopter 24. Each of these diopters is continuous. The projection lens 4 forms a continuous strip of material. The surface of the exit diopter 24 follows the geometry of a toroidal surface produced by rotating a circle about an axis offset from its center. Two identical modules therefore have two identical surface elements of the same torus and can be assembled horizontally in the normal mounting direction to form a continuous surface element of the same torus having a double surface. The surface created in this way by the exit diopters 24 can be widened by adding identical modules.

According to a preferred embodiment of the invention, the radius of curvature R of the exit diopter 24 of the projection lens 4 is given by the following equation:

$$R = \frac{L}{2}\left(\sin\left(\frac{\alpha}{2}\right)^{-1}\right) \quad (1.1)$$

in which L is the width of the projection lens seen from in front and $\alpha = k(\Delta\theta)/N$. $\Delta\theta$ is the angular width in degrees of a light segment projected by the module and k and N are positive integers.

The light segment width is substantially equal to the mid-height width of the intensity profile.

Figures 2A, 2B:
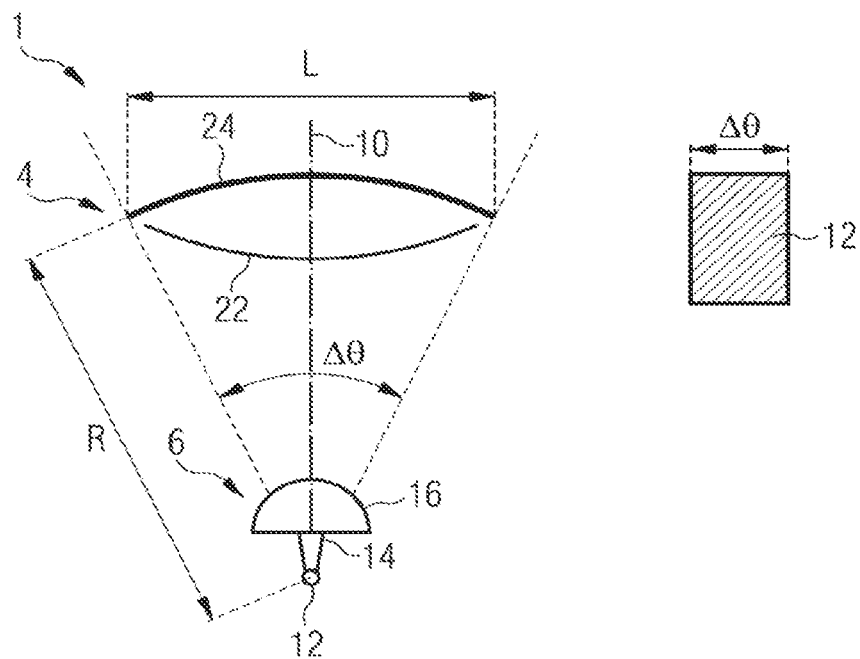

The quantities operative in equation 1.1 are illustrated diagrammatically in FIG. 2a, which is a diagrammatic top view of a lighting module according to the invention in the situation where $\alpha = \Delta\theta$.

L is the width of the projection lens seen from in front; in the instance shown, this is the length of a chord of a circle of radius R the center of which is the location of the single light source 12 of the module, the chord subtending an angle $\Delta\theta$.

$\Delta\theta$ is the angular width in degrees of a light segment projected by the module.

The radius of curvature R is preferably greater than 200 mm and preferably between 400 and 1200 mm inclusive. The angle $\Delta\theta$ is preferably between 1.5° and 3° inclusive.

The entry face 22 of the projection lens 4 preferably has a convex geometry in the horizontal direction, as shown in FIG. 2a. The convexity is preferably centered on the optical axis 10 of the primary optical element.

FIG. 2b shows diagrammatically a light segment in the form of a light strip that the module 1 from FIG. 2a is able to project onto the road in front of the vehicle equipped with the module. The single light source 12 creates a single strip of angular width $\Delta\theta$. Similar modules capable of creating a plurality of parallel strips of identical width (contiguous or spaced by an angular width $\Delta\theta$) using a plurality of light sources and/or primary optical elements can be produced by the person skilled in the art using a projection lens conforming to the formula according to the invention.

The example described hereinafter shows the impact of the factor N involved in the calculation of the radius of curvature of the exit diopter of the projection lens according to the invention. When a plurality of identical modules, which therefore have the same radius of curvature R, are placed side by side, the integer factor N defines a factor of multiplication of the resolution obtained by the juxtaposition of the modules. This is illustrated by way of example in FIGS. 3a and 3b. In FIG. 3a, two identical modules (N=1) similar to that shown in FIG. 2a are juxtaposed horizontally in the normal mounting direction. The two light strips created by the light source 12 of the first module and the light source 12b is of the second module both have an angular width equal to $\Delta\theta$ and do not overlap laterally. The angle $\Delta\theta$ between the optical axes of the two continuous modules is therefore substantially equal, ignoring cut-off blurring effects, to the angular width of a light strip. This angle defines the resolution of the beam obtained.

In FIG. 3b the factor N is equal to 2. This results in a lateral superposition of the projected light strip halves. The horizontal angle between the optical axes of the two contiguous modules is, ignoring blurring effects, substantially half the angular width of a light segment. The resolution is therefore doubled. As N increases, the resolution of the overall beam produced by an assembly of identical modules increases, while the overall width of the beam decreases.

The factor k operative in the calculation of the radius of curvature of the exit diopter of the projection lens according to the invention is a predefined integer.

It corresponds to the choice to produce the overall light beam with segments generated by a lighting device including at least two modules according to the invention.

The factor k is the number of pixels constituting a light group coming from a single module up to encountering a pixel coming from another module of the lighting device in a particular widthwise direction of the overall beam (from left to right or vice versa). The term luminous group therefore denotes a set of contiguous or overlapping pixels produced exclusively by a module, each module projecting at least one light group, which groups can be contiguous or spaced. The light group contains at least one pixel.

The overall beam of a lighting device producing light segments consists of a succession of light groups coming from at least two identical modules according to the invention, which groups can be contiguous or overlap depending on the chosen factor N.

For practical reasons of modular design and compactness of the module of the invention, k will be chosen to be less than or equal to 50, more generally less than or equal to 20 and preferably less than or equal to 10.

Similarly, N will advantageously be between 1 and 4 inclusive.

In the following examples, the light segment is formed of a single pixel and takes the form of a vertically oriented rectangular light strip.

A first example is shown diagrammatically by FIG. 4, which shows two sets of k=2 pixels 112 projected by a first module and two sets of pixels 112b is projected by a second module identical to the first module. In the situation shown the curvature according to equation 1.1 uses the factors k=2 and N=1. The pixels projected by the two identical modules are interleaved to create a beam consisting of contiguous pixels.

Figure 7A:
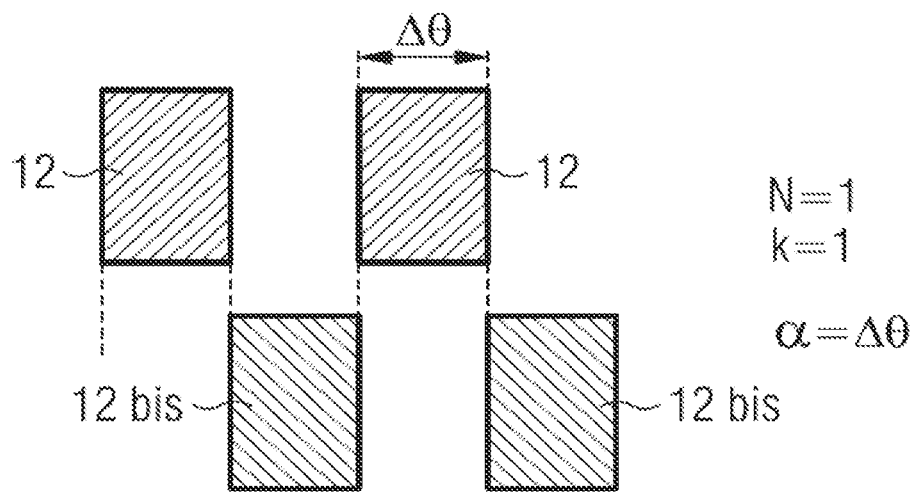
FIGS. 7A and 7B show light strips projected by modules according to other embodiments of the invention.
Figure 7B:
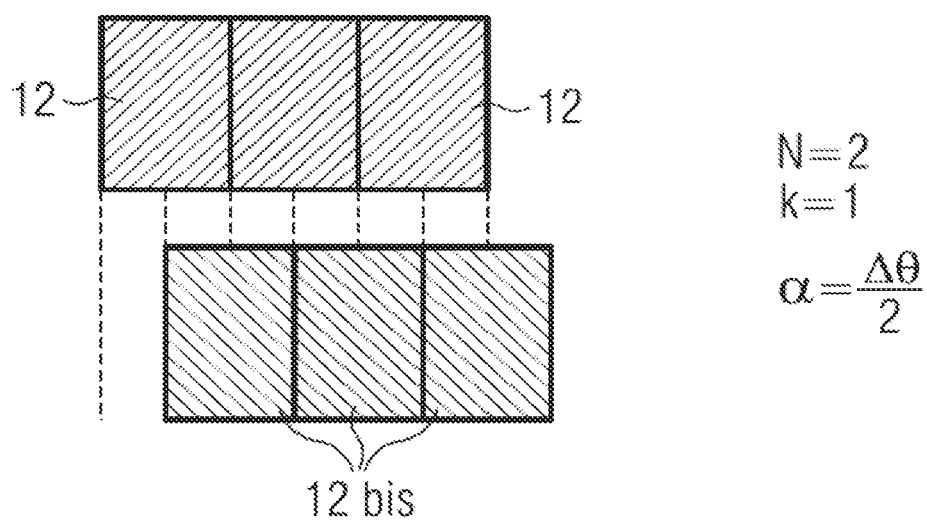

FIGS. 7A and 7B show other examples of possible configurations of overall beams with light strips generated by at least two modules according to the invention associated with a lighting device producing light segments in the form of strips. To make this easier to understand, in these two figures the pixels in the form of strips coming from each of the modules are not shown superposed, it being understood that the overall beam results from the summation of the pixels. In FIG. 7A, N=1 and k=1, each module generating two spaced pixels. In FIG. 7B, k=1 and N=2, each module generating three distinct and contiguous pixels, the pixels of the first module and the second module then overlapping.

In all the embodiments, in order to facilitate the horizontal juxtaposition of the modules, it is preferable for the width of the module or its casing in the normal mounting direction to increase or decrease in the direction of the light emitted by the module. The width of the rear part is preferably strictly less than that of the front part accommodating the projection lens. The rear part is advantageously at least five times less wide than the front part. The rear part is preferably 5% to 50% less wide than the front part. This is shown by the FIG. 5 diagram, which is a top view of an assembly of eight identical modules according to the invention disposed laterally in contact.

Alternatively, the width of the front part is strictly less than that of the rear part. In this case the front part is advantageously at least five times less wide that the rear part. The front part is preferably 5% to 50% less wide than the rear part.

In all the embodiments of the invention, the module may include lateral positioning or alignment means to facilitate the juxtaposition of two identical modules horizontally in the normal mounting direction so that the exit diopters of the modules form a continuous toroidal surface element. The alignment means can be in the projection lens or in the support means for retaining the various components of the module at their intended location. Alternatively, the alignment means may be in a heatsink element of the module that is not shown.

FIG. 6 shows by way of example an internal section of a projection lens according to one embodiment of the invention. The section is taken in a vertical plane transverse to the optical axis. The alignment means include notches 26 and protrusions 25 on the lateral edges of the projection lens. The location of the notches and protrusions is chosen so that the protrusions of a first module according to the invention can be engaged in the corresponding notches of an identical horizontally juxtaposed module in the normal direction of mounting of the module. Other notch and protrusion geometries can obviously be envisaged without departing from the scope of the invention.

It is clear that the invention is not limited to the modular embodiment of motor vehicle lighting devices producing light segments including a single pixel in the form of vertically oriented rectangular light strips, as shown in the examples, and that other segment shapes may be arrived at by the person skilled in the art without departing from the scope of the present invention.

The present description and the examples shown in the figures enable the person skilled in the art to create a panoply of lighting modules according to the invention by using different parameters in equation 1.1. The assemblies of such modules can then be used to create headlights producing light segments for motor vehicles having different optical signatures.

The invention claimed is:

1. An assembly including a plurality of identical lighting modules, each module including:
at least one primary optical element having a light pixel forming structure intended to cooperate with at least one light source and a corrector exit diopter, each primary optical element defining an optical axis;
a projection lens;
wherein the lighting modules are assembled in horizontal juxtaposition in a-normal mounting direction so that the respective projection lenses form a continuous surface of the assembly, the exit diopter of the projection lens having a toroidal shape in the normal mounting direction, and the light entering the primary optical element or elements and leaving via the projection lens being projected in the form of a polygon light segment or a strip light segment formed of at least one light pixel.

2. The assembly according to claim 1, wherein the normal mounting direction in a horizontal plane the exit diopter of the projection lens has a convex curvature with a radius of curvature R given by the formula:

$$R = \frac{L}{2}\left(\sin\left(\frac{\alpha}{2}\right)^{-1}\right)$$

wherein L is the width of the projection lens seen from in front;
$\alpha = k(\Delta\theta)/N$, where $\Delta\theta$ is the angular width in degrees of a light segment projected by the module and k and N are positive integers.

3. The assembly according to claim 2, wherein the exit diopter of the projection lens has in the normal mounting direction in a horizontal plane a convex curvature with a radius of curvature R greater than 200 mm.

4. The assembly according to claim 1, wherein the exit diopter of the projection lens has in the normal mounting direction in a horizontal plane a convex curvature with a radius of curvature R greater than 200 mm.

5. The assembly according to claim 4, wherein the projection lens includes in the normal mounting direction in a horizontal plane an entry diopter with at least one part having a convex profile, the convexity or convexities being generally aligned to the positions of the optical axes of the primary optical elements of each module.

6. The assembly according to claim 1, wherein the projection lens includes in the normal mounting direction in a horizontal plane an entry diopter with at least one part having a convex profile, the convexity or convexities being generally aligned to the positions of the optical axes of the primary optical elements of the module.

7. The assembly according to claim 6, wherein an intermediate lens for each primary optical element is disposed between the exit diopter of the primary optical element and the projection lens, the intermediate lens being configured to concentrate the radiation from the exit diopter of the corresponding primary optical element on the projection lens.

8. The assembly according to claim 1, wherein an intermediate lens for each primary optical element is disposed between the exit diopter of the primary optical element and the projection lens, the intermediate lens being configured to concentrate the radiation from the exit diopter of the corresponding primary optical element on the projection lens.

9. The assembly according to claim 8, wherein the pixel forming structures include at least one light guide and/or cushions.

10. The assembly according to claim 1, wherein the pixel forming structures include at least one light guide and/or cushions.

11. The assembly according to claim 1, wherein the at least one light source or sources include(s) at least one light-emitting diode (LED) and/or one laser diode.

12. The assembly according to claim 1, wherein each module includes lateral positioning means intended to juxtapose two identical modules horizontally in the normal mounting direction so that the exit diopters of the modules form the continuous surface.

13. The assembly according to claim 12, wherein the positioning means include at least one notch in a first lateral face of the projection lens and at least one protrusion in the second lateral face so that the at least one protrusion of a first module can be engaged in the corresponding at least one notch of an identical module juxtaposed horizontally in the normal mounting direction.

14. The assembly according to claim 12, wherein the module includes support means on which the light source or sources and the projection lens are disposed, the support means including the lateral positioning means.

15. The assembly according to claim 1, wherein the width of the module in the normal mounting direction is increasing in the direction of the light emitted by the module.

16. The assembly according to claim 15, wherein the smallest width of the module in the normal mounting direction is 5 to 50% narrower than the greatest width of the module in the normal mounting direction.

17. The assembly according to claim 1, wherein the width of the module in the normal mounting direction is decreasing in the direction of the light emitted by the module.

18. A motor vehicle headlight wherein the headlight includes a lighting device producing light strips and including at least one assembly as claimed in claim 1.

* * * * *